April 21, 1953     O. B. MISZ     2,635,344

SLOPE INDICATOR

Filed Oct. 5, 1950

INVENTOR
OLIVER B. MISZ
BY Scott L. Norwid
ATTORNEY

Patented Apr. 21, 1953

2,635,344

UNITED STATES PATENT OFFICE 2,635,344

SLOPE INDICATOR

Oliver B. Misz, Phoenix, Ariz., assignor, by decree of distribution, to Dorothy Misz Application October 5, 1950, Serial No. 188,521

9 Claims. (Cl. 33—145)

This invention pertains to slope indicators.

This invention is an improvement on my Patent No. 2,304,313 issued on an application dated May 17, 1941, and Patent No. 2,308,018 issued to me January 12, 1943 on an application filed July 25, 1941.

One of its objects is the provision of an indicator which is sturdy, light and easy to use, and will give a direct reading of slope or incline in any desired units with a minimum amount of manipulation;

Another object is to provide a slope indicator which has no hinged parts, and which is compact, sturdy and not easily gotten out of adjustment;

Still another object is to provide a slope indicator which has a beam which affords support for a calibrated arcuate bar, provided with a spirit level and which is curved in an arc having a radius equal to indicated points of support at the ends of the beam and arranged so that longitudinal shifting of the bar will vary its effective level indication and enable the slope of the beam to be determined by direct reading of the calibration indicia thereon with reference to a fixed line on said beam.

Other objects will appear hereinafter.

I attain the foregoing objects by means of the devices, construction and arrangement of parts shown in the accompanying drawings in which—

Figure 3:
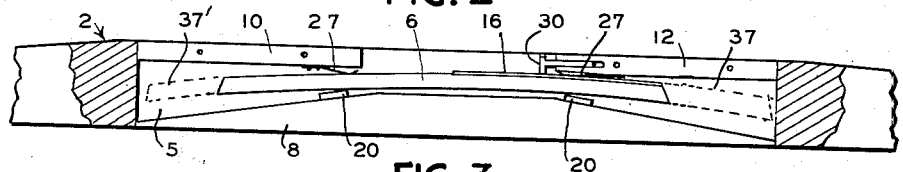
Figure 4:
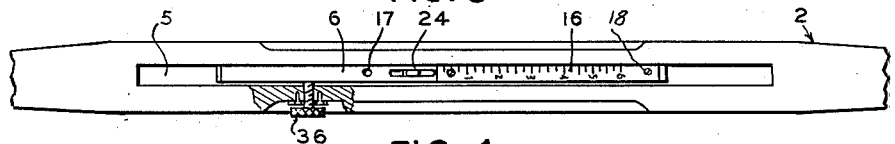
Figure 5:
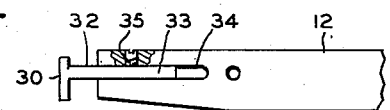
Figure 6:
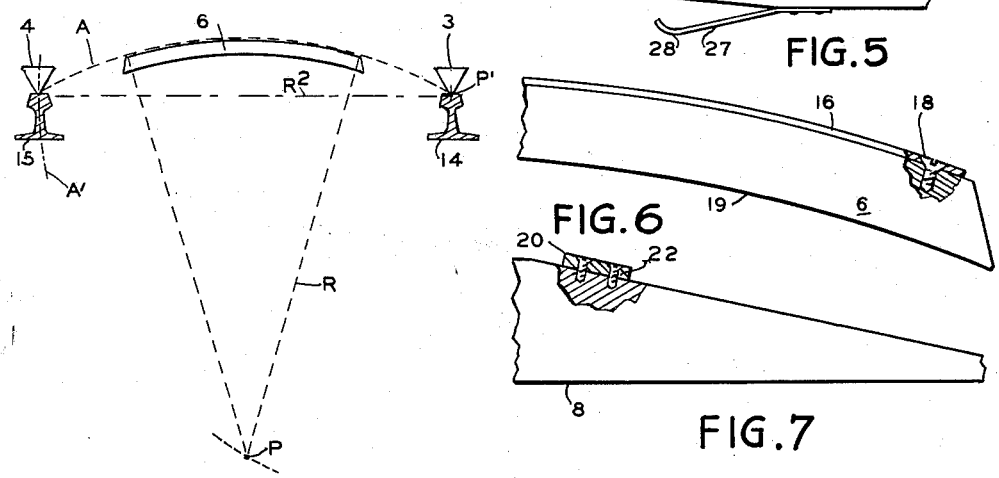
Figure 7:
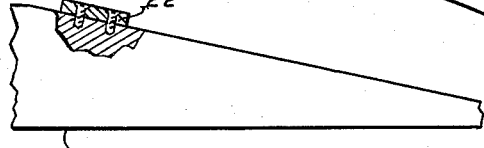
Figure 8:
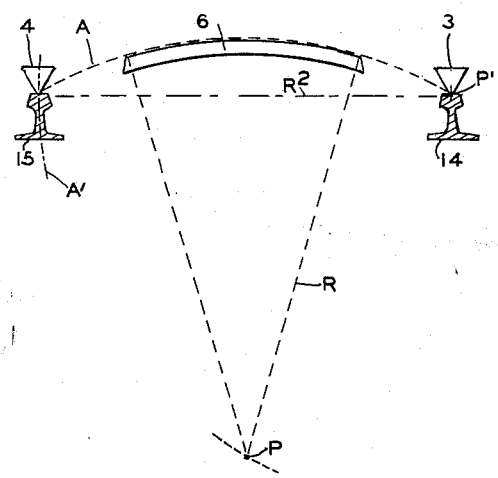

Figure 3, a side elevation, mid-portion of the indicator beam with parts broken away to show interior, and drawn on an enlarged scale;

Figure 4 is a plan view of the indicator beam as shown in Figure 3;

Figure 5 is a side elevational view of the inner end of one of the bar retainers drawn on an enlarged scale;

Figure 6 is a side elevation of one end of the arcuate slope indicating bar, drawn on an enlarged scale;

Figure 7 is a side elevational view of an end portion of the filler block, drawn on an enlarged scale; and Figure 8 is a diagrammatic representation of the elements involved in measuring and indicating slopes.

Similar numerals refer to similar parts in the several views:

The beam 2, forming the body of the device 3 is preferably made of wood. This is long enough to support the positioning pad 3 at one end, which in this case is the lower end, and the positioning pad and spacer 4, at the opposite end. These pads form a means for determining the points between which slope is to be determined. A vertically extending slot 5 is formed in the middle of beam 2, and is sized to receive the arcuate slope indicating bar 6. The filler block 8 is inserted into the slot from the bottom and held by transverse screws 11. Hold down bars 10 and 12 are positioned in the top of the slot adjacent each end and are held in place by transverse screws 25.

The arcuate slope indicating bar 6 is made of light metal, such as aluminum or the like, has a square section, and is longitudinally curved in a vertical plane to an arc generated from a predetermined radius. In the form of the device here illustrated this radius is the equivalent of the distance between the points of support of the positioning pads 3 and 4 on rails 14 and 15.

Near the left end of this bar, as shown in Figure 4, there is a finger socket or hole 17. Along the top of the right hand portion there is an indicating scale 16 which is attached by screws 18. The bottom surface 19 of this bar is curved as above stated, and is smoothed so as to slide easily on the edges 20 of supporting blocks 22 which are positioned on the downwardly slanting end portions of the top face of filler block 8. These blocks are in separated positions so as to contact the bottom face of bar 6 adjacent its ends. Since these blocks are attached to the slanting end portions of block 8, only the upper edges 20 actually contact bar 6.

Slightly to the left of the center of bar 6 there is a spirit level 24 cemented in a slot in its upper face. This is positioned so that its tube extends longitudinally relative to the bar and is in determined relation to scale 16.

Hold down bars 10 and 12, which may also be termed retainers, are secured by transverse screws 25 in the upper portion of slot 5. These are likewise made of metal and have a substantially square section. They fit tightly into slot 5 and extend from each end toward the central portion of the slot.

Hold down leaf springs 27 are attached to the bottom faces of each of these bars. These springs are each shaped to provide a rounded bend 28 which bears on the top face of bar 6 and maintains it resiliently in contact with supporting blocks 22.

Right hand bar 12 is provided with an adjustable measuring face 30, positioned immediately over scale 16. This face is formed on the T shaped slide 32, the stem 33 of which slides in a slot 34 in the inner end of the bar. The slide is maintained in position by set screw 35.

Normally the slope indicating bar 6 is free to slide longitudinally in slot 5 as indicated by dotted lines 37 and 37', Figure 3. When it is desired to lock it at any desired position a transversely extending indicating bar lock screw 36 is set up tightly against the side of bar 6. This binds it against the opposite side of slot 5 and effectively locks it in position.

Figure 1:
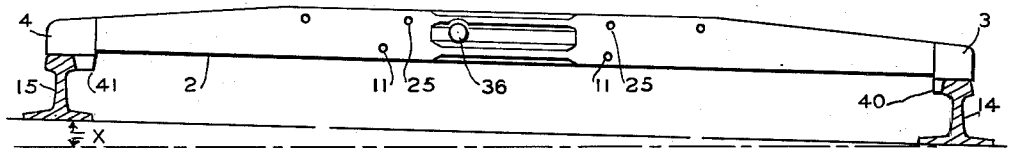
Figure 1 is a side elevation of the indicator as applied to the indication of slope between a pair of track rails.
Figure 2:
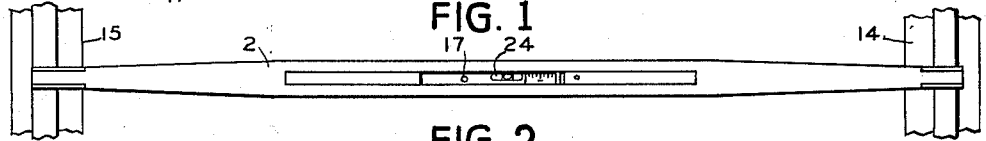
Figure 2 is a plan view thereof.

In use, in the exemplification of the device as herein principally concerned, the beam 2 is placed across the rails 14 and 15 with the pads 3 and 4 resting on the rails as shown. In order to determine the slope or slant of the rails the bar locking screw 36 is released and the bar shifted from left to right by placing the finger in socket 17 until the bubble of spirit level 24 indicates a zero or central reading. The scale 16 is then observed at the measuring face 30 of adjustable indicator 32. This scale can be calibrated to read in inches of elevation as one contact pad bears to the other. This is explained by reference to Figure 8. Arcuate bar 6 is formed with its curved top face generated from the radius struck from the point P. This radius is equal to the radius R2 which is struck from the point P', at the center of the right hand rail 14 and extends to the center of the left hand rail 15; any distance that bar 6 must be moved longitudinally to maintain a level indication of the spirit bubble 24, Figure 2, is a true reflection of the slope or of the change in elevation x Figure 1 of one rail relative to the opposite rail.

Measurements of those distances which the bar 6 has been moved longitudinally are made by observations of scale 16 at indicator face 30.

To correctly position the adjustable indicator face 30, loosen set screw 35, Figure 5, place beam 2 on a horizontal plane, position bar 6 to bring level bubble 24 to a level indication and by use of set screw 35 fix adjustable indicator 32 so that its face 30 is directly over the zero end of scale 16. Adjustment of indicator face 30 should be made at such times as may be necessary to compensate for any warping of the beam that may take place.

When the device is used to indicate the slope between rails, as here explained, pad 3 may be provided with a lug 40 which forms a shoulder against which rail 14 may rest, and pad 4 may be provided with a lug 41 of predetermined thickness. The outer shoulder may then be used to receive rail 15 and act as a track gauge inspection tool while the thickness of the lug 41 may be used for inspection of spacing between the main rail and the guard rail at switches and the like.

Primarily, however, the device as here disclosed is best suited to indicating the slope between track rails, particularly on curves. If the slope is not known and is to be determined, screw 36 is released and the bar 6 moved longitudinally until a level indication is obtained in level 24. If the track is to be brought to a predetermined transverse slope the bar 6 is locked at a predetermined position by screw 36 and the rails relatively raised or lowered until a level indication is obtained.

While I have hereinabove described a slope indicator having pads for positioning the beam on rails, as one exemplary form of my invention it is obvious that the indicator has many other uses.

These may, for example, include the measurement of slope of floor surfaces, pipe lines, and the like. Also, whereas the measurement of slopes between the rails of tracks is most conveniently given in inches, and wherever measurement is to be made between two separated points the slope may usually be best determined in units of linear measure, it is within the intendments of the invention that slope may be indicated by ratios, such as one inch per foot, or as a trigonometric function, or as a number of degrees of a circle. The scale 16 may be marked accordingly, and the pads 3 and 4 removed and the lower edge of beam 2 positioned directly on an object, the slope of which is to be determined or indicated. After removal of pads 3 and 4 the lower edge of beam 2 may then be termed a straight edge. In case the scale is to be calibrated in degrees of a circle the beam is placed with its lower edge (straight edge) bearing on an object with a horizontal plane face, and the bar 6 positioned in slot 5 so that the spirit level shows a level reading and so that the face 30 indicates zero on scale 16. This may be a base reference point or mark.

Measurement along the upper face of scale 16 for each one degree of arc is then marked as predetermined from the length of the radius of the arc.

$$(2R3.1416)$$
$$360$$

These degree marks are spaced on the upper face of bar 6 at equal intervals representing degrees of a circle having a radius congruent with the radius of the arc of the said upper face of the bar. Shifting the bar on its concentric lower face on supports 20 is the same as rotating an arc portion of a circle beneath the reference face 30. Whenever beam 2 is held at a slant or slope and bar 6 moved to attain a level reading on spirit level 24 the degree of slope can be read on a scale of degrees of a circle marked on the upper face of bar 6.

Other and further modifications and changes will no doubt suggest themselves to those familiar with the art and, therefore I wish to be limited only by the following claims:

I claim:

1. A slope indicator comprising; a beam having contact pads at each end; a vertical slot in its mid-portion including spaced indicating bar supports extending transversely within said slot; an arcuate indicating bar having parallel concentric upper and lower faces; a spirit level on its upper face; and a scale including indicia on its upper face, slidably mounted on its lower face in said slot on said supports so as to move in an arcuate path determined by the curve of its lower face; hold down bars at each end of said slot adapted to resiliently maintain said bar on said slidable supports, a vertical reference face on one of said hold down bars positioned above said scale, and a lock screw on said beam adapted to lock said arcuate bar in position.

2. A slope indicator comprising in combination, a beam having a vertical slot adapted to contain a slidable arcuate bar; an arcuate bar having an upper and a lower face; a scale of slope values on said upper face of said bar; and a spirit level adjacent said scale; two fixed bearings in said slot adapted to engage the lower face of said bar and support it so that it has free longitudinal movement within said slot; hold down bars in said slot having leaf springs adapted to bear on the upper face of said bar to resiliently press it on said bearings; a fixed indication mark on said beam, from which longitudinal movements of said bar may be observed on said scale, when it is moved while supported on said bearings, and a locking means on said beam adapted to lock said bar against longitudinal movement.

3. A slope indicator, comprising in combination, a beam having positioning pads at each end, and a vertically extending slot in the midportion thereof; a filler block secured in the bottom portion of said slot having supporting blocks with upwardly extending transverse edges secured to its top face positioned in separate relation adjacent its opposite ends; an arcuate slope indicating bar adapted to slide longitudinally of said beam within said slot with its bottom face slidably supported on said supporting blocks; a scale including slope indicating indicia, extending along one end portion of the upper face of said bar; a spirit level tube set into the upper face of said bar and positioned a determined distance from the indicia on said scale; a finger socket for slidably manipulating said bar on the upper face thereof; hold down bars secured in each end portion of the upper part of said slot having springs resiliently bearing on the upper face of said bar to maintain it in position on said supporting blocks; and a measuring face adjustably secured to the inner end of one of said hold down bars so as to be positioned over the scale on said arcuate bar.

4. A slope indicator, comprising in combination, a beam having positioning pads at each end, and a vertically extending slot in the midportion thereof; a filler block secured in the bottom portion of said slot having supporting blocks with upwardly extending transverse edges secured to its top face positioned in separate relation adjacent its opposite ends; an arcuate slope indicating bar adapted to slide longitudinally of said beam within said slot with its bottom face slidably supported on said supporting blocks; a scale including slope indicating indicia, extending along one end portion of the upper face of said bar; a spirit level tube set into the upper face of said bar and positioned a determined distance from the indicia on said scale; a finger socket for slidably manipulating said bar on the upper face thereof; hold down bars secured in each end portion of the upper part of said slot having springs resiliently bearing on the upper face of said bar to maintain it in position on said supporting blocks; and a measuring face adjustably secured to the inner end of one of said hold down bars so as to be positioned over the scale on said arcuate bar, and a locking screw on said beam adapted to engage a side face of said bar and lock it frictionally to retain it from longitudinal movement.

5. A slope indicator for indicating the slope from the horizontal between two objects separated a predetermined distance, comprising in combination, a beam having a centrally positioned vertically extending slot; positioning pads at each end thereof arranged to provide supporting positions for said beam on two objects, separated a predetermined distance, between which slope is to be determined; a filler block secured in the lower portion of said slot having supporting blocks with upwardly extending transverse supporting edges separated in longitudinally disposed positions thereon; an arcuate slope indicating bar supported within said slot with its lower face bearing on the supporting edges of said supporting blocks having a substantially square section, an upper face formed with a longitudinal curve generated from a radius equal to the distance between the supporting positions of said pads on said beam and provided with a scale along one end portion having slope indicating indicia, a lower face having a curve concentric with said upper face, a spirit level tube on said upper face disposed adjacent the inner end of said scale, and a finger socket on said upper face.

6. In a slope indicator, for indicating the slope from the horizontal between two objects separated a predetermined distance, comprising in combination, a beam having a bottom edge provided with positioning pads disposed a determined distance apart, and a slotted central portion; an arcuate slope indicating bar having a lower face arcuately curved in determined relation to said positioning pads and an upper face provided with a longitudinally extending scale and a spirit level tube, slidably operative in said slot; longitudinally separated supports within the slotted central portion of said beam adapted to contact the lower face of said arcuate bar and provide support therefor; and a longitudinally variable scale reading face on said beam positioned above said bar scale.

7. In a slope indicator, for indicating the slope from the horizontal between two objects separated a predetermined distance, comprising in combination, a beam having a bottom edge provided with pads having positioning lugs disposed a determined distance apart, and a vertically slotted central portion; an arcuate slope indicating bar having a lower face arcuately curved in determined relation to the distance between said positioning lugs on said pads and an upper face provided with a longitudinally extending scale along one end portion and a spirit level tube disposed in determined relation to said scale, slidably operative in said slot; longitudinally separated supports within the slotted central portion of said beam having upwardly extending edges adapted to contact the lower face of said arcuate bar and provide support therefor; and a longitudinally variable scale reading face on said beam positioned above said bar scale.

8. A slope indicator composed of a beam having a straight edge, and two spaced bearings adapted to support an arcuate slope indicating bar, an arcuate slope indicating bar having an upper face curved longitudinally to conform to the arc of a circle and a lower face concentric to said upper face, supported on said beam, with its said lower face bearing on said spaced bearings, so as to slide longitudinally relative to said beam, a spirit level mounted on the upper face of said bar, a scale marked on the upper face of said bar, and a reference face on said beam for reading said scale.

9. A slope indicator composed of a beam having a straight edge, and two spaced bearings adapted to support an arcuate slope indicating bar, an arcuate slope indicating bar having an upper face curved longitudinally to conform to the arc of a circle and a lower face concentric to said upper face, supported on said beam, with its said lower face bearing on said spaced bearings, so as to slide longitudinally relative to said beam, a spirit level mounted on the upper face of said bar, a scale marked on the upper face of said bar, and a reference face on said beam for reading said scale, to determine the longitudinal position of said bar with reference to a base reference mark thereon when said bar is slid longitudinally of said beam to bring said spirit level to a level reading position.

OLIVER B. MISZ.

References Cited in the file of this patent

UNITED STATES PATENTS

| Number | Name | Date |
|---|---|---|
| 1,224,165 | Hansen | May 1, 1917 |
| 1,459,381 | Von Serkey | June 19, 1923 |
| 1,829,257 | Best | Oct. 27, 1931 |
| 2,170,824 | Lichtenwalner | Aug. 29, 1939 |
| 2,304,313 | Misz | Dec. 8, 1942 |
| 2,308,018 | Misz | Jan. 12, 1943 |
| 2,358,010 | Holmes | Sept. 12, 1944 |

FOREIGN PATENTS

| Number | Country | Date |
|---|---|---|
| 394,061 | Great Britain | June 22, 1933 |
| 796,871 | France | 1936 |